(12) United States Patent
Eller et al.

(10) Patent No.: US 6,455,711 B1
(45) Date of Patent: Sep. 24, 2002

(54) METHOD FOR PRODUCING POLYTETRAHYDROFURAN

(75) Inventors: Karsten Eller, Ludwigshafen; Michael Hesse, Worms; Rainer Becker, Bad Dürkheim; Arthur Höhn, Kirchheim; Heinz Rütter, Hochdorf-Assenheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/486,643

(22) PCT Filed: Aug. 21, 1998

(86) PCT No.: PCT/EP98/05331

§ 371 (c)(1),
(2), (4) Date: Feb. 29, 2000

(87) PCT Pub. No.: WO99/12992

PCT Pub. Date: Mar. 18, 1999

(30) Foreign Application Priority Data

| Sep. 5, 1997 | (DE) | 19738863 |
|---|---|---|
| Jan. 16, 1998 | (DE) | 19801419 |

(51) Int. Cl.$^7$ ............................................. C07D 307/02
(52) U.S. Cl. ...................... 549/472; 528/405; 528/408; 528/413; 528/409; 560/12
(58) Field of Search ................................ 560/263, 112, 560/240; 554/148, 168; 569/472; 528/405, 408, 409, 413, 425

(56) References Cited

U.S. PATENT DOCUMENTS

| 3,433,829 A | | 3/1969 | Doerffelt | |
| 4,189,566 A | * | 2/1980 | Mueller et al. | 528/408 |
| 4,235,751 A | | 11/1980 | Del Pesco | |
| 4,271,043 A | * | 6/1981 | Vaughan et al. | 252/184 |
| 4,329,445 A | | 5/1982 | Del Pesco | |
| 4,452,910 A | * | 6/1984 | Hopkins et al. | |
| 4,480,124 A | | 10/1984 | Mueller | |
| 5,262,562 A | * | 11/1993 | Hollingsworth et al. | 560/240 |
| 5,641,857 A | * | 6/1997 | Dostalek et al. | |
| 6,124,368 A | * | 9/2000 | Eller et al. | |

FOREIGN PATENT DOCUMENTS

| DE | 1226560 | * 10/1966 |
| DE | 28 01 792 | 7/1979 |
| DE | 195 13 493 | 3/1996 |
| EP | 61 668 | 10/1982 |
| EP | 250 168 | 12/1987 |
| GB | 2 164 636 | 3/1986 |
| WO | 94/05719 | 3/1994 |

OTHER PUBLICATIONS

Dissolution of hectorite in . . . Komadel et al., Clays and Clay Minerals, vol. 44, No. 2, 228–236, 1996.

* cited by examiner

*Primary Examiner*—Paul J. Killos
*Assistant Examiner*—Taylor V. Oh
(74) *Attorney, Agent, or Firm*—Keil & Weinkauf

(57) ABSTRACT

A process for preparing polytetrahydrofuran, polytetrahydrofuran copolymers or diesters or monoesters of these polymers comprises polymerizing tetrahydrofuran in the presence of at least one telogen and/or comonomer over a heterogeneous catalyst comprising hectorite.

9 Claims, No Drawings

METHOD FOR PRODUCING POLYTETRAHYDROFURAN

DESCRIPTION

The present invention relates to an improved process for preparing polytetrahydrofuran, polytetrahydrofuran copolymers or diesters or monoesters of these polymers by polymerizing tetrahydrofuran in the presence of at least one telogen and/or comonomer over a hectorite polymerization catalyst.

Polytetrahydrofuran ("PTHF"), also known as poly(oxybutylene glycol), is a versatile intermediate in the plastics and synthetic fibers industry, inter alia for the preparation of polyurethane, polyester and polyamide elastomers, for which it is used as diol component. In addition, polytetrahydrofuran and also some of its derivatives are valuable auxiliaries in many applications, for example as dispersants or for deinking waste paper.

In industry, PTHF is advantageously prepared by polymerization of tetrahydrofuran over suitable catalysts in the presence of reagents which make it possible to control the length of the polymer chains and thus to adjust the mean molecular weight to the desired value (chain terminators or telogens). The control is provided through choice of type and amount of telogen. Additional functional groups at one end or both ends of the polymer chain may be introduced by selection of suitable telogens. Thus, for example, the monoesters or diesters of PTHF can be prepared by using carboxylic acids or carboxylic anhydrides as telogens.

Other telogens act not just as chain terminators, but are also incorporated into the growing PTHF polymer chain. So they can be thought of as comonomers as well as telogens. Examples of such comonomers are telogens having two hydroxyl groups such as dialcohols. Examples for such dialcohols are ethylene glycol, butylene glycol, 1,4-butanediol, 1,6-hexanediol or low molecular weight PTHF. Suitable comonomers are furthermore 1,2-alkylene oxides, for example ethylene oxide or propylene oxide, 2-methyltetrahydrofuran or 3-methyltetrahydrofuran. With the exception of water, 1,4-butanediol and low molecular weight PTHF, the use of such comonomers gives rise to the formation of tetrahydrofuran copolymers. In this way, the PTHF can be chemically modified. An example is the use of the telogen 2-butyne-1,4-diol which leads to the presence of a proportion of C≡C triple bonds in the PTHF polymer chains. PTHF modified in this way can be further chemically modified at these sites owing to the reactivity of these triple bonds, for example by hydrogenation of the triple bonds to double bonds, by subsequent grafting with other monomers to adjust the properties of the polymer, by crosslinking to form polymers having a comparatively rigid structure, or by other conventional methods of polymer chemistry. Complete hydrogenation of the triple bonds present is likewise possible and generally leads to PTHF having a particularly low color number.

As extensive studies have shown, acidic catalysts are suitable for the polymerization of THF on an industrial scale, but has the disadvantage of giving polymers with a yellow to brownish discoloration. The discoloration increases with the polymerization temperature and increasing conversion.

For instance, PCT/WO 94/05719 discloses a process for preparing polytetrahydrofuran diesters, by polymerization of THF over acid-activated kaolin, zeolites or amorphous alumosilicates.

DE-A 19 513 493 teaches a process for preparing polytetrahydrofuran esters by polymerization of tetrahydrofuran in the presence of a carboxylic anhydride over an acid-activated attapulgite polymerization catalyst. However, the conversions obtainable with the catalysts known from PCT/WO 94/05719 and DE-A 19 513 493 are poor. DE-A 12 26 560 discloses a process for preparing polytetrahydrofuran diesters over acid montmorillonites in the presence of acetic anhydride. It is true that acid montmorillonites give a higher conversion, but the color number of the polymers is correspondingly higher.

The purity of the PTHF also depends on the quality of the THF used.

The technical grade contains small amounts of impurities in a concentration of from 10 to 500 ppm. The chemical nature of these impurities is not known in every respect. Although this THF is of very high purity (it normally has a purity of 99.9%), even traces of impurities cause the above-mentioned discoloration on polymerization. In addition, at the same time as the discoloration, a changed reactivity is observed in the preparation of polyesters or polyurethanes from the polytetramethylene ether glycols. These deficiencies are serious, since color and reproducible processing are among the most important properties of a polymer which is to be used industrially.

Numerous treatment methods have therefore been proposed to improve the quality of technical grade THF. For instance, DE-A-2 801 792 describes a process in which THF is treated with bleaching earths before polymerization. Although this gives polymers having an improved color number, this method of treatment cannot in every case be applied reproducibly to every available technical grade of THF.

Processes for decolorizing polymers obtained over acidic heterogeneous catalysts in a separate decolorization process following the polymerization are also known.

According to EP-A 61 668, polytetramethyl ether glycol or diesters thereof having a low color number are prepared by subjecting the polymers obtained by a cationic polymerization of THF to a hydrogen treatment in the presence of a hydrogenation catalyst. If the polymerization is carried out using a commercially available THF grade, the hydrodecolorization has to be effected at very high hydrogen pressures of, for example, from 50 to 300 bar.

It is an object of the present invention to provide a process for preparing polytetrahydrofuran, tetrahydrofuran copolymers or diesters or monoesters of these polymers which enables the preparation of THF polymers and copolymers having a low color number in a simple and economical manner. Since the economic viability of a heterogeneously catalyzed PTHF process is critically dependent on the productivity of the catalyst, it is also an object of the present invention to improve the catalyst activity compared to the known catalysts while maintaining a low color number for the polymers.

We have found that this object is achieved by a process for preparing polytetrahydrofuran, polytetrahydrofuran copolymers or diesters or monoesters of these polymers by polymerizing tetrahydrofuran in the presence of at least one telogen and/or comonomer over a heterogeneous catalyst comprising hectorite.

Hectorite is a clay and in particular a member of the smectite family. In the process of the invention, naturally occurring or synthetic hectorite may be used, preference being given to using synthetic hectorite. Replacement of the hydroxyl groups by fluorine yields fluorohectorites which may likewise be used as synthetic hectorites in the process of the invention. Synthetic smectites are described, for example, in GB-A 2 164 636 and synthetic hectorites are sold, for example, under the tradename Laponit®RD by Laporte, (Laponite Technical Bulletin L 104/90/A). Synthetic hectorites may include, from their process of production, varying amounts of water. On drying, hectorites give off absorbed water. Calcination also liberates water by dehydroxylation. Hectorites used according to the invention preferably contain less than 1% by weight of alkali metal ions.

Preference is given to essentially water-free hectorites obtained from commercially available water-containing hectorites by drying at from 80° C. to 200° C., preferably from 100° C. to 150° C., under atmospheric pressure for from 1 hour to 20 hours. However, drying may also be effected at reduced pressure and low temperatures. Dried hectorites may additionally be calcined at from 150° C. to 600° C., preferably from 200° C. to 500° C., for from 0.5 hour to 12 hours, preferably from 1 hour to 5 hours.

Hectorites used in the process of the invention are preferably activated prior to use by acid treatment, preferably using mineral acids, such as hydrochloric acid, sulfuric acid, nitric acid or phosphoric acid, particularly preferably using sulfuric acid and/or hydrochloric acid, or using organic acids such as formic acid or citric acid.

The acid activation, which is described, for example, by Komadel et al. in Clays and Clay Min. 44 (1996), 228–236, is effected by suspending the powdered hectorite in the acid used, the solids content of the suspension being in the range from 1 to 50% by weight. The suspension is reacted at from 30° C. to 120° C., preferably from 50° C. to 110° C. for from 0.5 hour to 24 hours, preferably from 1 hour to 12 hours, with stirring. The hectorite acid-activated in this way is then separated off, washed with water, dried as described above and calcined, if desired.

The hectorite may be employed in the process of the invention as a powder, for example if the process of the invention is carried out in suspension, or advantageously as shaped articles, for example in the form of cylinders, spheres, rings or granules, especially if the catalyst is arranged in a fixed bed, which is preferred if, for example, loop reactors are used or if the process is carried out continuously.

Suitable telogens for use in the preparation of PTHF diesters are carboxylic anhydrides derived from $C_2$–$C_{20}$-monocarboxylic acids, for example acetic anhydride, propionic anhydride and butyric anhydride. PTHF diesters obtained by using these telogens may be converted into PTHF by various methods (as described in U.S. Pat. No. 4,460,796, for example).

Telogens used for the preparation of PTHF monoesters of monocarboxylic acids are generally $C_1$–$C_{20}$-monocarboxylic acids, preferably $C_1$–$C_8$-monocarboxylic acids, particularly preferably formic acid, acetic acid, propionic acid, 2-ethylhexanoic acid, acrylic acid and methacrylic acid.

A suitable telogen for the preparation of THF copolymers is 1,4-butynediol. The resulting copolymer may subsequently be converted into PTHF by hydrogenation of the triple bonds, but also exhibits interesting properties as such.

Other THF copolymers may be obtained by using 1,2-alkylene oxides, preferably ethylene oxide or propylene oxide, 2-methyltetrahydrofuran, 3-methyltetrahydrofuran or diols such as ethylene glycol or 1,6-hexanediol.

PTHF is obtained by the process of the invention in one step using water and/or 1,4-butanediol as telogens. It is also possible, if desired, to recycle low molecular weight, open-chain PTHF having a molecular weight of from 200 to 700 dalton into the polymerization reaction to act as a telogen and to be converted into higher molecular weight PTHF. Since 1,4-butanediol and low molecular weight PTHF have two hydroxyl groups, they are incorporated in the PTHF chain not only terminally as telogens but also internally as monomers.

The telogen is advantageously fed to the polymerization as a solution in THF. Since the telogen causes the termination of the polymerization, the average molecular weight of the PTHF or of the PTHF diester can be controlled by means of the amount of telogen used. The greater the amount of telogen present in the reaction mixture, the lower the average molecular weight of the PTHF or of the relevant PTHF derivative. Depending on the telogen content of the polymerization mixture, PTHF or the relevant PTHF derivatives having average molecular weights of from 250 to 10000 can be prepared in a controlled manner. The process of the invention is preferably used to prepare PTHF or the relevant PTHF derivatives having average molecular weights of from 500 to 10000 dalton, particularly preferably from 650 to 5000 dalton.

The polymerization is generally carried out at from 0 to 80° C., preferably at from 25° C. to the boiling temperature of THF. The pressure employed is generally not critical for the result of the polymerization, which is therefore generally carried out at atmospheric pressure or under the autogenous pressure of the polymerization system, except for copolymerizations of THF with the highly volatile 1,2-alkylene oxides, which are advantageously carried out under superatmospheric pressure.

To avoid the formation of ether peroxides, the polymerization is advantageously carried out under an inert gas atmosphere, for nitrogen, hydrogen, carbon dioxide or noble gases, nitrogen being preferred.

It is particularly advantageous to carry out the polymerization under a hydrogen atmosphere. This embodiment results in a particularly low color number of the resulting polymers. The hydrogen partial pressure may be selected from 0.1 to 50 bar. When carrying out the polymerization in the presence of hydrogen, the color number may be further improved by doping the calcium montmorillonite with transition metals of groups 7 to 10 of the Periodic Table of the Elements, for example with ruthenium, rhenium, nickel, iron, cobalt, palladium and/or platinum.

The process of the invention can be carried out batchwise or continuously, a continuous process being generally preferred for economic reasons.

In the batch process, the THF, the relevant telogen and/or comonomer and the catalyst are generally reacted at the abovementioned temperatures in a stirred tank or in a loop reactor until the desired conversion of THF is achieved. The reaction time may be 0.5–40 hours, preferably 1–30 hours, depending on the amount of catalyst added. The catalysts are generally used in the polymerization in an amount of 1–90% by weight, preferably 4–70% by weight, particularly preferably 8–60% by weight, based on the weight of THF used.

In the batchwise process, the reaction effluent is worked up by removing the catalyst present in the effluent, conveniently by filtration, decanting or centrifugation. The polymerization effluent freed from catalyst is generally worked up by distillation, in which case unconverted THF is advantageously distilled off and then, if desired, low molecular weight PTHF oligomer is removed from the polymer by distillation under reduced pressure.

EXAMPLES

Catalyst Preparation

Catalyst A 80 g of synthetic hectorite (Laponit®RD available from Laporte and having the approximate composition: $Na_{0.46}Mg_{5.46}Li_{0.46}Si_8(OH)_4O_{20} \cdot nH_2O$) was calcined at 400° C. for 2 hours.

Catalyst B 100 g of synthetic hectorite (Laponit®RD available from Laporte) were stirred in 4 l 1n $H_2SO_4$ at 60° C. for 6 hours. The acid-activated hectorite was then filtered off, washed with 5 l of distilled water, dried at 120° C. for 3 hours and subsequently calcined at 200° C. for 7 hours.

Catalyst C

The preparation of catalyst C was carried out as described for Catalyst B, except that the acid activation was carried out at 100° C.

Comparative Catalyst V1 (according to DE-A 1 226 560)

Comparative Catalyst V1 was an acid-activated montmorillonite available from Sudchemie under the tradename Tonsil® Optimum 210 FF.

Comparative Catalyst V2 (according to WO 94/05719)

600 g of kaolin (Kaolin TEC 2® from Amberger Kaolinwerke) were stirred in a solution of 240 g of ammonium chloride in 2.160 g of distilled water at room temperature for 1 hour. The kaolin was then filtered off, washed with water, dried at 120° C. for 18 hours and calcined at 650° C. for 2 hours. The cooled acid-activated kaolin was finally powdered.

Comparative Catalyst V3 (according to DE-A 19 513 493)

650 g of attapulgite LVM (Floridin® from Chemie-Mineralien AG, Bremen, Germany) were stirred in a solution of 8.2 g of a 36.5% strength hydrochloric acid in 1,491.8 g of water for 30 minutes. The acid-activated attapulgite was then decanted, washed with water, dried at 120° C. for 7 hours and calcined at 300° C. for 2 hours.

Batchwise THF Polymerization 10 g of catalyst in 182 g of tetrahydrofuran and 18 g of acetic anhydride were suspended in a 500 ml glass flask and stirred at 50° C. for 45 minutes. The catalyst was then filtered off and the color number of the filtrate determined according to the method of DIN 53409 and ASTM-D-1209. The filtrate was then concentrated on a rotary evaporator and the polytetrahydrofuran diacetate obtained was weighed to determine the conversion. The color numbers and conversions determined are shown in Table 1 below.

TABLE 1

| Catalyst | Conversion [% by weight] | Color number of filtrate [APHA] |
|---|---|---|
| A | 6.0 | 15 |
| B | 10.5 | 15 |
| C | 13.1 | 10 |
| V1 | 8.3 | 25 |
| V2 | 1.5 | 5 |
| V3 | 2.0 | 10 |

The result of the comparative runs carried out shows that the catalysts A, B and C used according to the invention give rise to lower color numbers and better conversions than the comparative catalysts V2 and V3. Furthermore, at conversions of more than 6% by weight, the catalysts A, B and C give considerably lower color numbers than the comparative catalyst V1.

We claim:

1. A process for preparing polytetrahydrofuran, polytetrahydrofuran copolymers or diesters or monoesters of these polymers, which comprises polymerizing tetrahydrofuran in the presence of at least one telogen and/or comonomer over a heterogeneous catalyst comprising hectorite.

2. A process as claimed in claim 1, wherein a synthetic hectorite is used.

3. A process as claimed in claim 1, wherein the hectorite is calcined at from 200° C. to 500° C.

4. A process as claimed in claim 1, wherein the hectorite is activated by acid treatment.

5. A process as claimed in claim 1, wherein the telogen and/or comonomer used is water, 1,4-butanediol, 2-butyne-1,4-diol, polytetrahydrofuran having a molecular weight of from 200 to 700 dalton, a $C_1$–$C_{20}$-monocarboxylic acid, a $C_2$–$C_{20}$-monocarboxylic anhydride, a 1,2-alkylene oxide, 2-methyltetrahydrofuran, 3-methyltetrahydrofuran, a diol or a mixture thereof.

6. A process as claimed in claim 1, wherein the telogen used is acetic anhydride.

7. A process as claimed in claim 1, wherein the telogen used is formic acid or acetic acid.

8. A process as claimed in claim 1, wherein the catalyst is doped with at least one transition metal of groups 7 to 10 of the Periodic Table of the Elements.

9. A process as claimed in claim 1, wherein the polymerization is carried out in the presence of hydrogen.

\* \* \* \* \*